United States Patent
Monti (10) Patent No.: US 7,320,203 B2
(45) Date of Patent: Jan. 22, 2008

(54) METHOD FOR PACKAGING ARTICLES IN BOXES AND A MACHINE WHICH CARRIES OUT THE METHOD

(75) Inventor: Giuseppe Monti, Pianoro (IT)

(73) Assignee: Marchesini Group S.p.A., Bologna (IT)

( * ) Notice: Subject to any disclaimer, the term of this patent is extended or adjusted under 35 U.S.C. 154(b) by 0 days.

(21) Appl. No.: 11/535,685

(22) Filed: Sep. 27, 2006

(65) Prior Publication Data
US 2007/0079575 A1   Apr. 12, 2007

(30) Foreign Application Priority Data
Sep. 28, 2005   (IT) .......................... BO2005A0584

(51) Int. Cl.
B65B 5/04   (2006.01)
B65B 43/28   (2006.01)

(52) U.S. Cl. ............................... 53/458; 53/468; 53/579

(58) Field of Classification Search ................... 53/458, 53/579
See application file for complete search history.

(56) References Cited

U.S. PATENT DOCUMENTS

| | | | |
|---|---|---|---|
| 4,578,929 A * | 4/1986 | Tisma | 53/525 |
| 4,614,079 A * | 9/1986 | Ida et al. | 53/563 |
| 4,633,655 A | 1/1987 | Nigrelli | |
| 4,802,324 A * | 2/1989 | Everson | 53/398 |
| 5,027,586 A * | 7/1991 | Ramaker | 53/458 |
| 6,363,696 B1 * | 4/2002 | Tisma | 53/574 |

FOREIGN PATENT DOCUMENTS

| | | |
|---|---|---|
| EP | 0 248 700 A1 | 12/1987 |
| WO | WO 96/07592 | 3/1996 |
| WO | WO 98/57857 | 12/1998 |

* cited by examiner

*Primary Examiner*—John Sipos
(74) *Attorney, Agent, or Firm*—William J. Sapone; Coleman Sudol Sapone P.C.

(57) ABSTRACT

In a method for packaging articles, a tubular blank is conveyed in flat folded configuration to an erecting station to be engaged and rotated by suction cups. The raised blank assumes a parallelepiped shape with a vertical axis, while a striker hit a lateral wall of the blank, so that the blank is erected in a box. While the box is being moved, first and second lower flaps are then folded before the blank is set resting on a support plane and moved, by driving and guiding conveyors, to a filling station for insertion of articles, supplied along a vertical direction, into the box. Lastly, the box with the articles therein is moved by the driving and guiding conveyors to subsequent stations for folding lower lateral flaps and upper flaps to close bottom and cover of the so obtained box. A machine is provided for carrying out the method, with an erecting station and a filling station joined by a horizontal support plane. The blanks are erected in the erecting station and moved to the filling station along the horizontal plane. Flaps are closed during the motion of the blanks before the filling station. After insertion of the articles, the boxes are closed.

15 Claims, 12 Drawing Sheets

METHOD FOR PACKAGING ARTICLES IN BOXES AND A MACHINE WHICH CARRIES OUT THE METHOD

FIELD OF THE INVENTION

The present invention relates to boxing machines, and in particular it concerns a method and a machine for packaging articles in boxes.

DESCRIPTION OF THE PRIOR ART

As known, the boxing machines package articles or packs of articles of various kind.

In general terms, the operations performed in similar machines are as follows:
A flat folded tubular blank is taken out from a magazine, the blank is erected so that it assumes a parallelepiped form
  having rectangular section and vertical (horizontal) axis,
the box thus obtained is filled with articles or packs of articles, moved along a vertical (transversal) direction,
the box flaps are folded and sealed in order to define the bottom and the cover of the box.

It is commonly known that some of the above operations can be performed in an order different from the one given above or include more steps (for example, there can be a first folding of the flaps forming the box bottom, filling articles to the box and then folding the flaps forming the box cover), in relation to the machine each time considered.

In the known boxing machines, including in-vertical article filling, the erected blank is usually driven to the filling station by conveying means, aimed at maintaining, when the size changes, the bottom and the center longitudinal line aligned with two corresponding fixed ideal planes, one horizontal and one vertical.

In this way, the manipulating means, aimed at introducing the articles into the boxes being formed and working in the filling station, perform vertical strokes with a constant maximum stroke, independently from the dimensions of the containers being used.

Consequently, a production rate, which can be accepted for boxes of large dimensions, does not imply satisfying filling times for boxes of minimum dimensions, or anyway smaller, for which a higher production rate is normally expected.

SUMMARY OF THE INVENTION

Therefore, the main object of the present invention is to propose an efficient solution for the above mentioned drawbacks, by contriving a method, and a boxing machine for carrying it out, which allow a significant reduction of the time required for introduction of the articles into the erected boxes, in particular for small dimensions thereof, thus increasing the production rate with respect to known solutions.

Another object of the present invention is to propose a method for packaging articles in boxes, which includes erecting the flat folded tubular blanks in horizontal configuration, in-vertical filling articles to the erected blanks and closing of the so obtained boxes.

This object must be pursued while also conceiving a simple method, whose realization allows high production rates and low costs with respect to prior art.

A further object of the present invention is to propose a machine for packaging articles in boxes, which carries out the above mentioned method and which allows the operator to visually inspect the boxes being formed each the time (erecting the tubular blank, filling and closing).

The proposed machine makes simple and immediate a possible direct assistance to the stations, in which the process steps are performed.

Moreover, the proposed machine must be essential in it construction, be reliable, ensure high production rate at relatively low costs, with respect to the results to be obtained.

The above mentioned objects are obtained, in accordance with the contents of the claims, by a method for packaging articles in boxes, the boxes being obtained from tubular blanks (1), including an upper sheet and a lower sheet, connected along two opposite ends and facing each other to define a flat folded configuration, each of said tubular blanks having also longitudinal pre-creasing lines for defining a first and a second adjacent lateral walls in said upper sheet, and a third and a fourth adjacent lateral walls in said lower sheet, and for facilitating folding of the tubular blank into a substantially parallelepiped shape, and having also transversal pre-creasing lines for defining and facilitating folding of a plurality of flaps, the method including the following steps:

conveying one tubular blank in flat folded configuration and in horizontal arrangement, to an erecting station;

gripping said first lateral wall of the tubular blank, by gripping and raising means and subsequent raising of the blank by a 90° rotation, so that the blank assumes a parallelepiped form with a vertical axis, due to the rotation raising and weight of the same blank;

striking at least one second lateral wall of said blank with said first lateral wall still subjected to the gripping action, to define an orientation at right angle of said second lateral wall with respect to said first lateral wall, with consequent erecting of the blank;

striking a first lower flap of the tubular blank, situated at rear with respect to a forwarding direction of the blank, with consequent inward folding of said first lower flap by a 90° angle;

moving the erected blank, still kept raised, in the forwarding direction, by said gripping and raising means, in said forwarding direction and towards a filling station;

striking a second lower flap of said tubular blank, opposite to said first lower flap and situated at the front with respect to the forwarding direction, with consequent inward folding thereof by a 90° angle, in step relation with said blank arriving at the filling station;

sliding of said first lower flap and the second lower flap, each folded inward by a 90° angle, on a horizontal support plane, situated in the filling station;

in said filling station, disengaging of the gripping and raising means from said first lateral wall and, in step relation, vertical insertion of at least one article into the erected blank, placed on the horizontal support plane;

sliding the tubular blank along said horizontal support plane by driving and guiding means, in said forwarding direction, to stations for folding the remaining lower lateral flaps and upper flaps of the blank and for closing bottom and cover of a box thus obtained, with said driving and guiding means acting on at least a longitudinal portion of said first lateral wall, in a part not engaged by said gripping and raising means, and on at least one longitudinal portion of said third lateral wall of said tubular blank, opposite to said first lateral wall.

The above mentioned method is carried out by a machine for packaging articles in boxes, the boxes being obtained from tubular blanks, including an upper sheet and a lower sheet, connected along two opposite ends and facing each other to define a flat folded configuration, each of said tubular blanks having also longitudinal pre-creasing lines for defining a first and a second adjacent lateral walls in said upper sheet, and a third and a fourth adjacent lateral walls in said lower sheet, and for facilitating folding of the tubular blank into a substantially parallelepiped shape, and having also transversal pre-creasing lines for defining and facilitating folding of a plurality of flaps, the machine including:

a unit, moving between an erecting station and a filling station for filling erected tubular blanks with articles supplied in a vertical direction, said unit erecting each blank of said tubular blanks in a parallelepiped shape with a vertical axis, and folding a first rear lower flap of the blank by a 90° angle while moving said blank in a forward direction towards said filling station;

a folding member, situated near the filling station for folding a second lower flap of the blank, opposite to said first lower flap and situated at front with respect to said forwarding direction, by a 90° angle, said folding being performed in time relation with the blank arriving at said filling station;

a horizontal plane for supporting the blank resting on said first lower flap and second lower flap while sliding to said filling station for inserting said articles, supplied in a vertical direction, into the blank by associated manipulating means;

driving and guiding means for driving and guiding said tubular blank along said horizontal plane in the forwarding direction, from said filling station up to means for folding the lower lateral flaps, the upper fore flap, the upper rear flap and the upper lateral flaps of said tubular blank, as well as to stations for closing the bottom and the cover of the so obtained box, said driving and guiding means including close-loop conveying means, operated by actuating means in time relation with the moving of said erecting and folding unit and with the in-vertical introduction of the articles into the erected blank, facing at least one longitudinal portion of each of the two opposite lateral walls of the blank, with respect to the forwarding direction, and having also lateral protrusions, which at least strike corresponding portions of the blank rear wall, pushing the blank in the forwarding direction.

BRIEF DESCRIPTION OF THE DRAWINGS

The characteristic features of the invention, not resulting from what above, will be better pointed out later, in accordance with the contents of claims and with the help of the enclosed figures, in which:

FIG. 8B is a section view taken along VIII-VIII of FIG. 1, of an erected blank of minimum dimensions;

FIGS. 9A-10A are respectively front and lateral views of a fourth detail of FIG. 1, that is means for folding upper lateral flaps of an erected blank of maximum dimensions, and an upper portion of the latter;

FIGS. 9B-10B are respectively front and lateral views of a fourth detail of FIG. 1, that is, means for folding upper lateral flaps of an erected blank of minimum dimensions, and an upper portion of the latter.

DISCLOSURE OF THE PREFERRED EMBODIMENTS

The apparatus and the method, carried out thereby, for packaging articles in boxes, both proposed by the present invention, will be described, with an explicit reference to the enclosed Figures.

Figure 3:
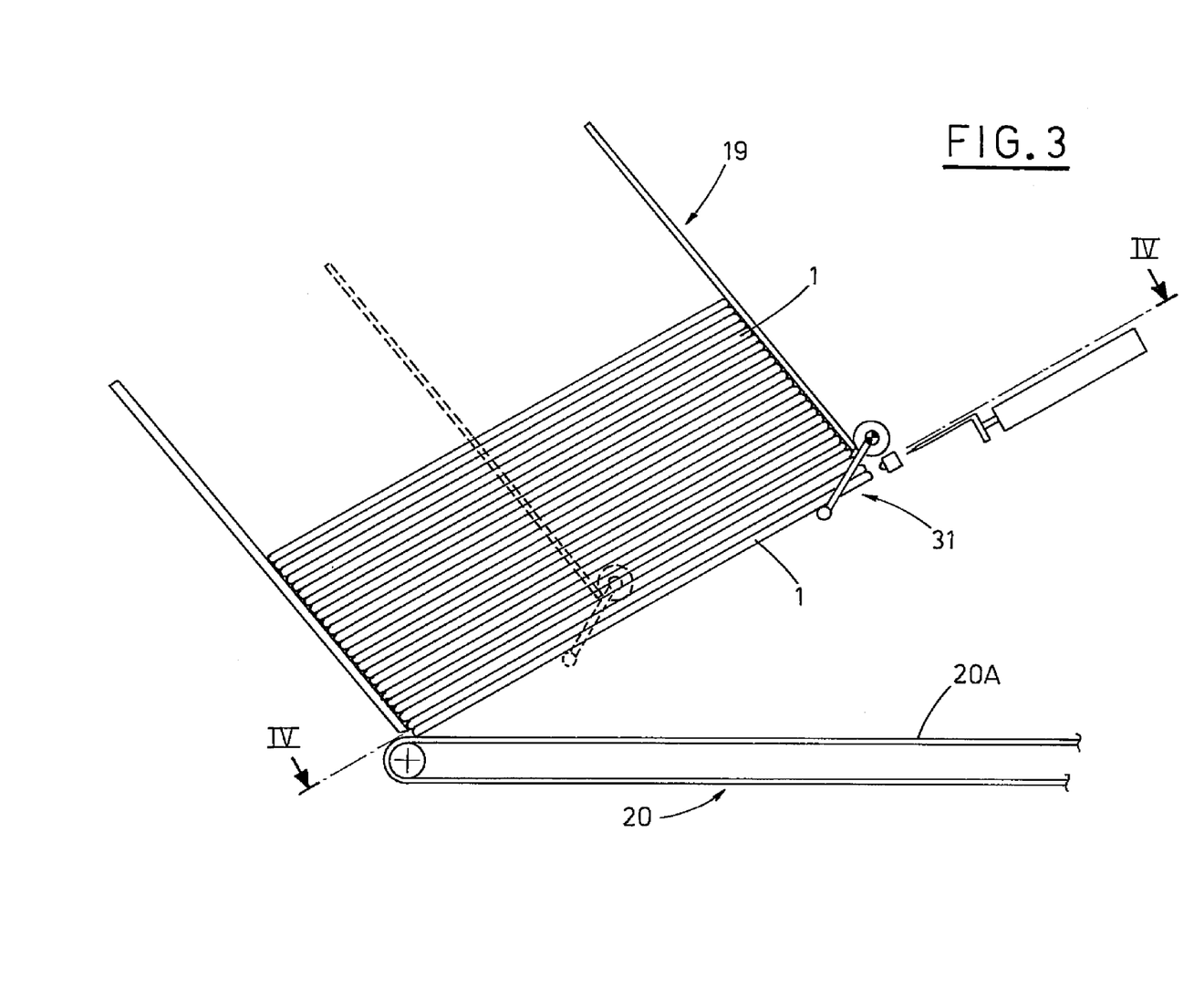
FIG. 3 is an enlarged, lateral view of a first detail of FIG. 1, that is a magazine for flat folded tubular blanks, in a first significant operation configuration.
Figure 5:
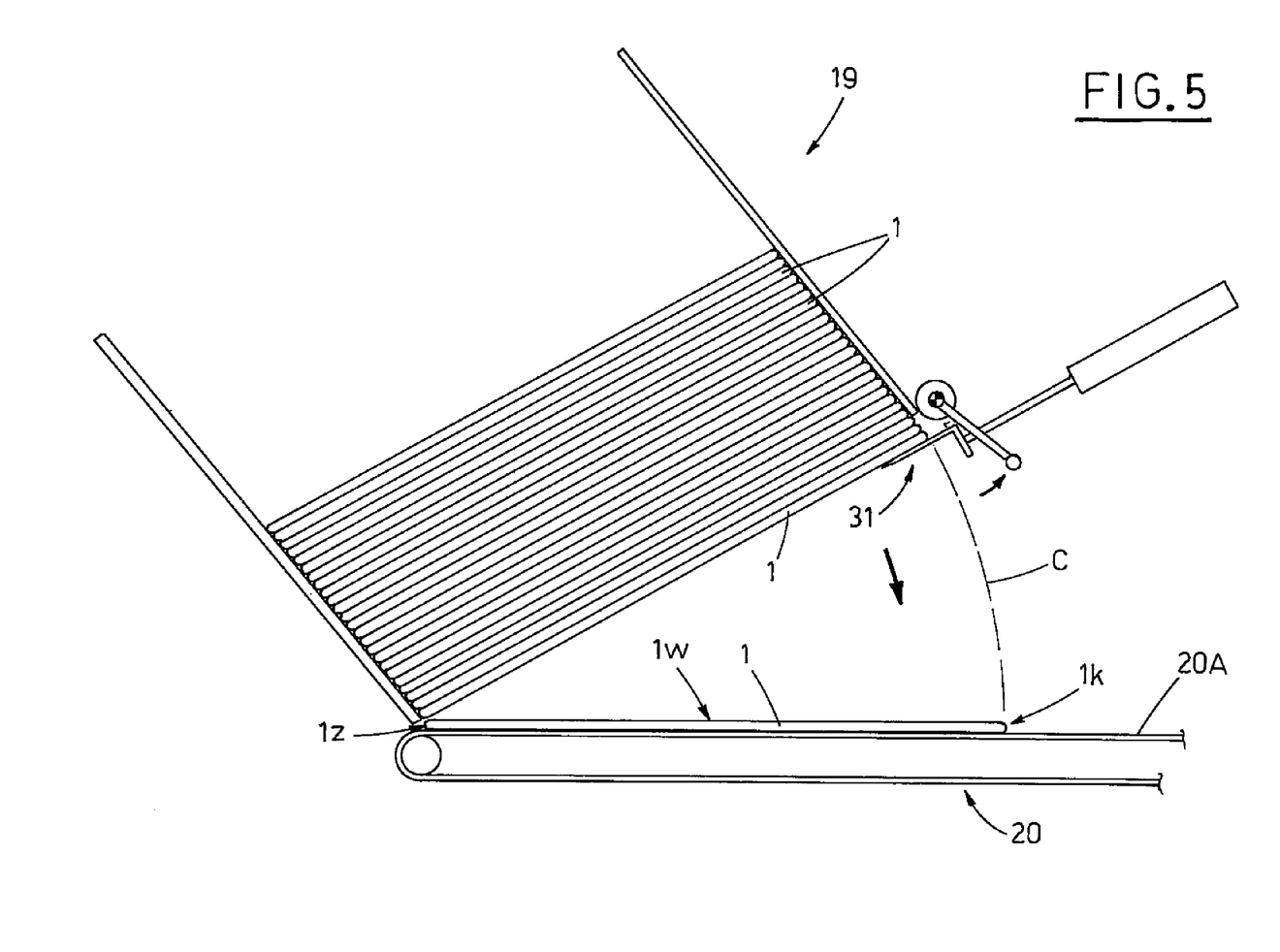
FIG. 5 shows the magazine of FIG. 3, in another significant operation configuration.

The reference numeral 19 indicates a magazine containing tubular blanks 1 in a flat configuration 1w and piled up, which are to be extracted one by one through the open bottom 31 (FIGS. 3, 5) and then released, following for example a falling trajectory having the form of a circumference arc C, on an active run 20A of conveying means 20, situated below.

The conveyor 20 conveys the tubular blanks 1 in flat folded configuration 1w and in horizontal position, one after another, to an erecting station S, until they strike against a fixed abutment 11, situated therein (FIG. 1), which defines a first stationary vertical reference plane Z.

Other details concerning the magazine 19 and the associated means, cooperating therewith in releasing of each tubular blank 1, can be found in the Italian Patent Application No. BO2005A 000582, owned by the holder of the present application.

It is specified that each tubular blank 1 is formed by an upper sheet 1h and a lower sheet, connected along two opposite ends 1k, 1z and initially facing each other to define the flat folded configuration 1w.

The tubular blanks 1 have also longitudinal pre-creasing lines, which facilitate the blank erecting so as to assume a substantially parallelepiped form, and transversal pre-creasing lines, facilitating in turn folding of lower flaps 5A, 5B, 5C and upper flaps 5D, 5E, 5F.

A unit 2, moving between the erecting station S and a filling station R, is aimed at erecting the tubular blanks 1 in flat folded configuration 1w and at folding their lower flap 5A, situated at the rear with respect to a prefixed forwarding direction AV, which indicates the forward motion of the tubular blanks 1 in the proposed boxing machine.

The unit 2 includes a carriage 32, moved by first actuator means (not shown) between the just mentioned stations S and R.

The carriage 32 bears first and second folder means 34, 35 and a group 33 for gripping a first lateral wall 6A of the blank 1 and for raising the blank 1 by rotating it so that it assumes a parallelepiped form with a vertical axis.

The gripping and raising unit 33 includes an arm 36 hinged to the carriage 32 according to a horizontal direction, perpendicular to the one defined by the longitudinal pre-creasing lines of the tubular blanks 1, reaching the erecting station S.

The arm 36 supports a plate 37, which carries gripping means 18 acting on the first lateral wall 6A of the blank, e.g. a plurality of suction cups 18A, connected to a vacuum source, not shown.

Second actuator means, likewise not shown as they are known, move the arm 36 between a horizontal position O and a vertical position V (see FIGS. 6A-6D), so as to have the arm make a 90° rotation between the two positions.

In particular, in the vertical position, the active surface of the suction cups 18A defines a second stationary vertical plane K, perpendicular to the first plane Z, discussed later on.

The first and second folder means 34, 35 will be cited only with reference to their specific function; other details concerning the unit 2 can be found in the Patent Application No. BO2005A 000583, owned by the holder of the present application.

Manipulating means of known type, working in the area between an article feeding line 38 and the filling station R, are aimed at in-vertical insertion of the articles 10 into the tubular blanks 1 or boxes, erected and with vertical axis, kept dwelling in the filling station R, as it will be better described later.

A hopper 39, situated in the filling station R, above the tubular blanks 1 passing there, is moved vertically by third actuator means 40 in step relation with the motion of the manipulating means 60 and of the tubular blanks 1.

Figure 1:
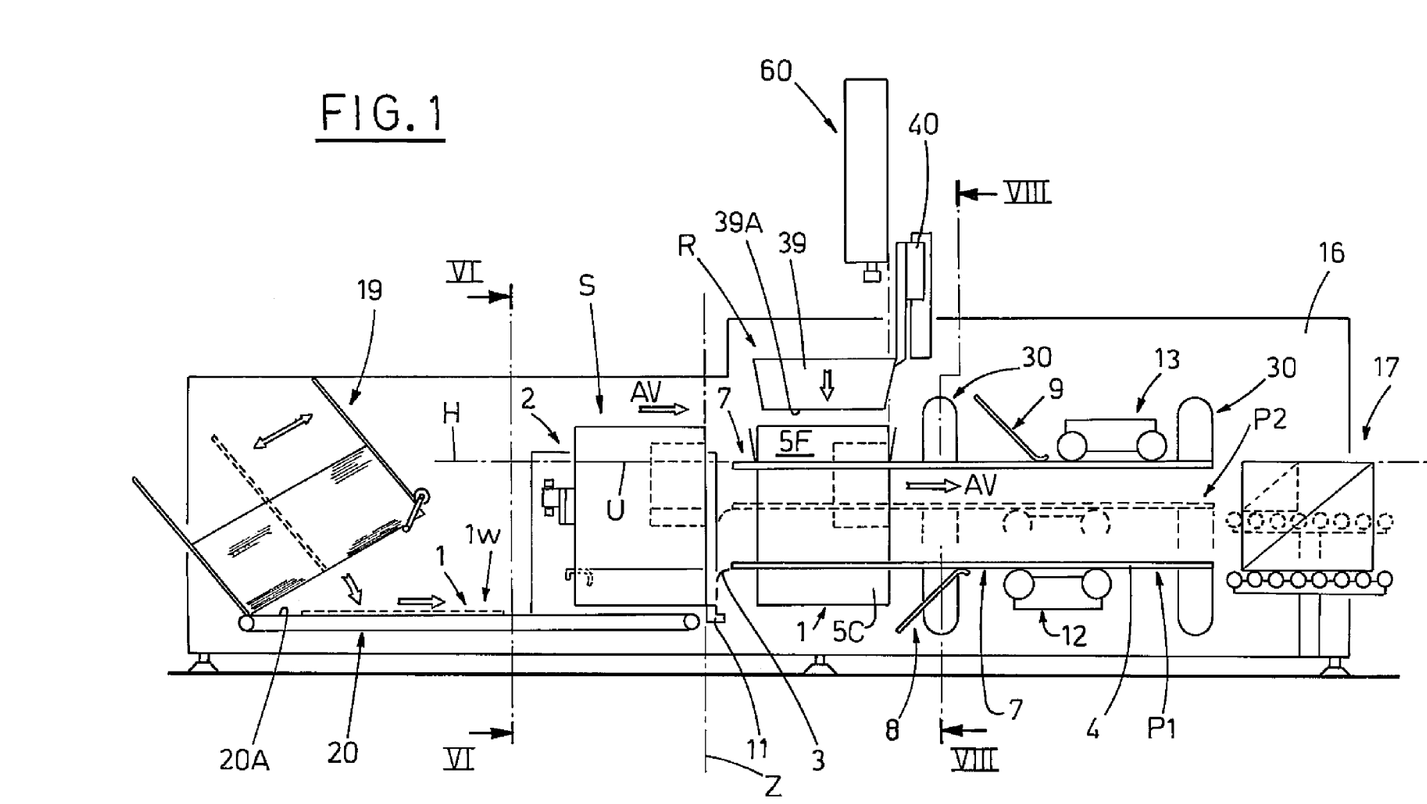
FIG. 1 is a partial and schematic, lateral view of the machine, carrying out the method proposed by the present invention, in a preferred embodiment.
Figure 2:
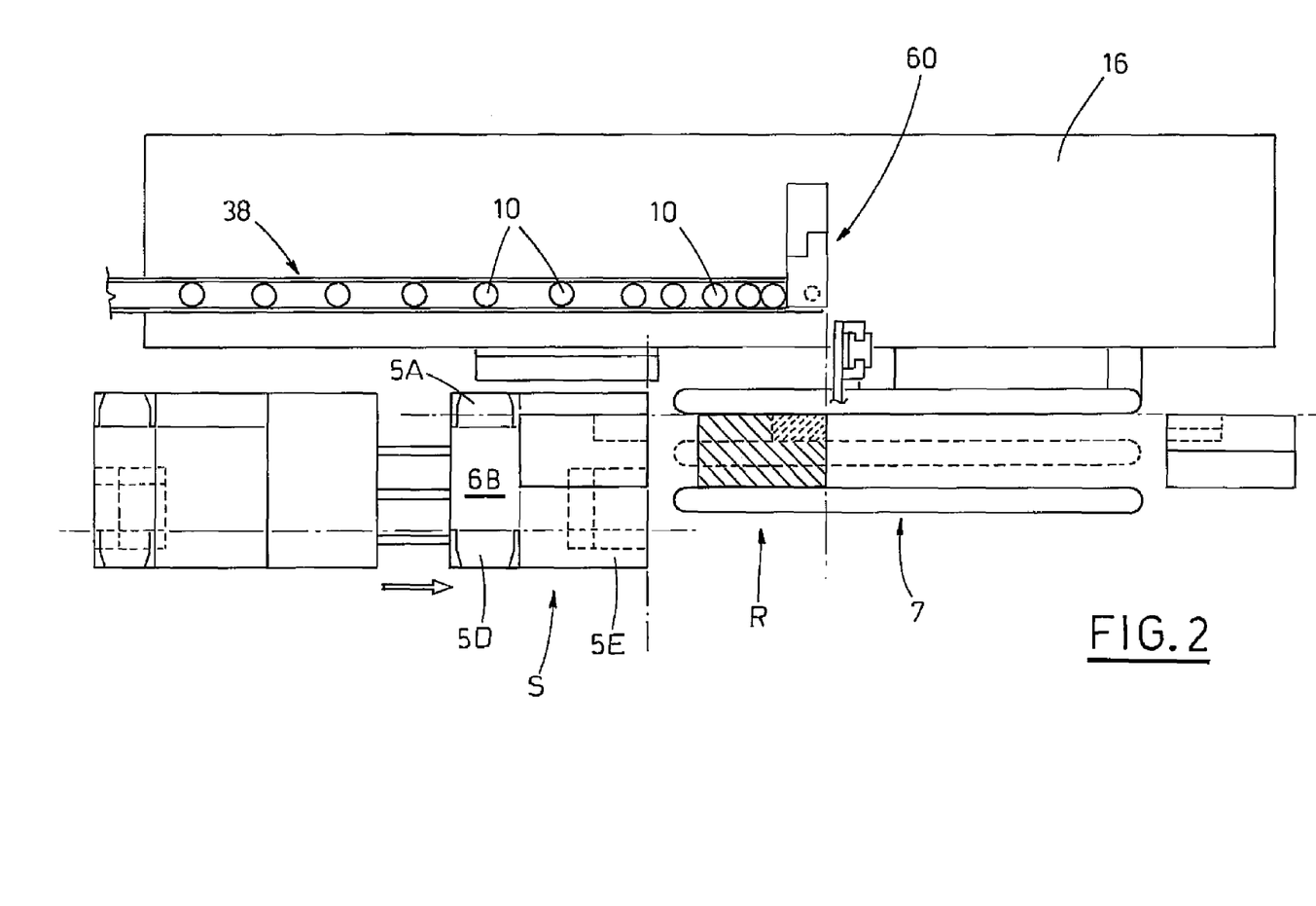
FIG. 2 is a partial and schematic, top view of the machine of FIG. 1.

A stationary folding member 3, shown schematically in FIG. 1, is situated close to the filling station R and is aimed at striking and folding by a 90° angle a second lower flap 5B of each tubular blank 1 reaching the filling station R.

In particular, the second lower flap 5B faces the first lower flap 5A, because it is situated at the front with respect to the forwarding direction AV.

A horizontal support plane 4 extends longitudinally from the filling station R up to at least a first station 12 for closing the bottom of the tubular blanks 1 (described later).

Figure 8A:
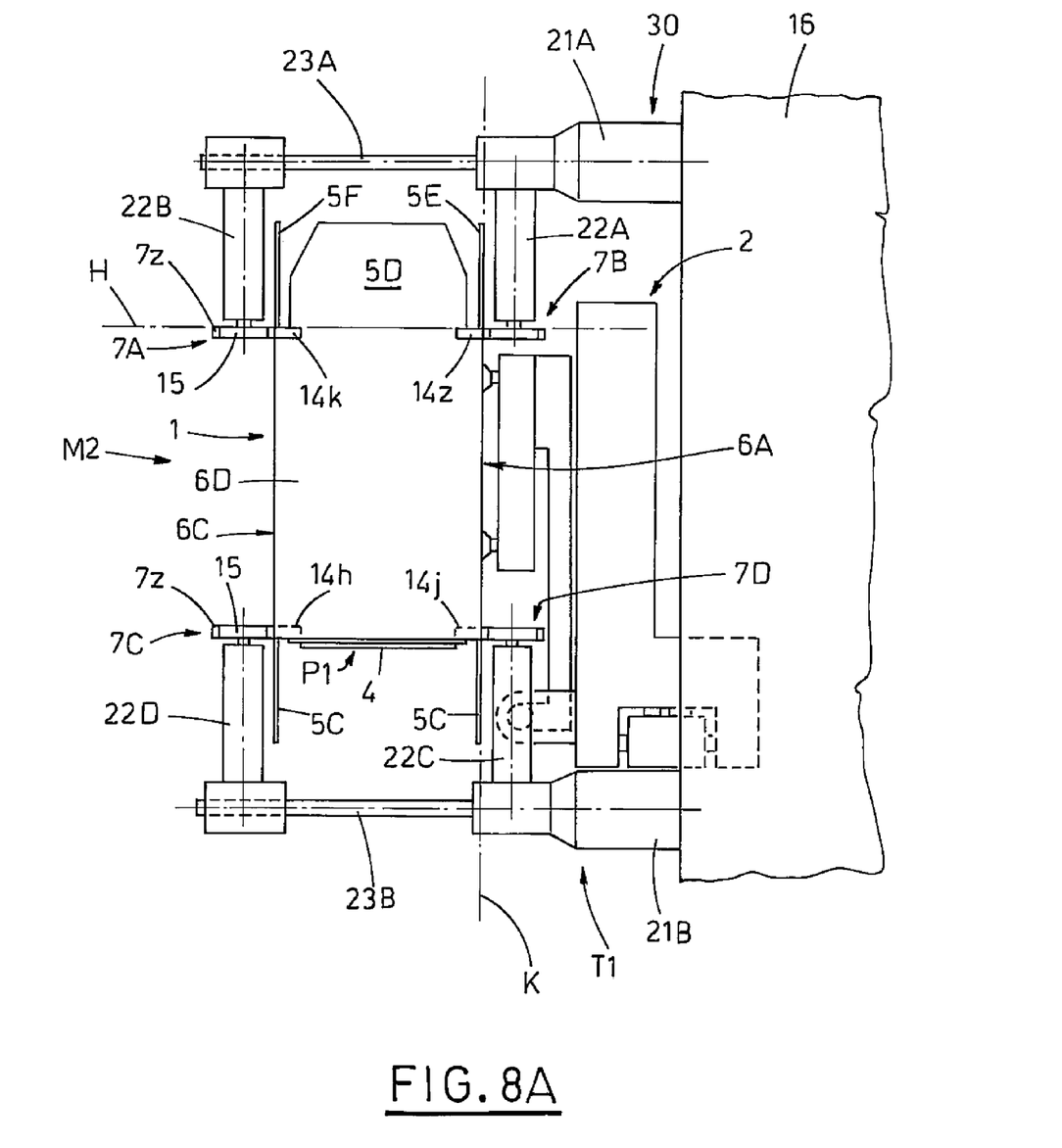
FIGS. 8A, 8B are section views taken along line VIII-VIII of FIG. 1, of an erected blank, of respectively maximum and minimum dimensions.
Figure 8B:
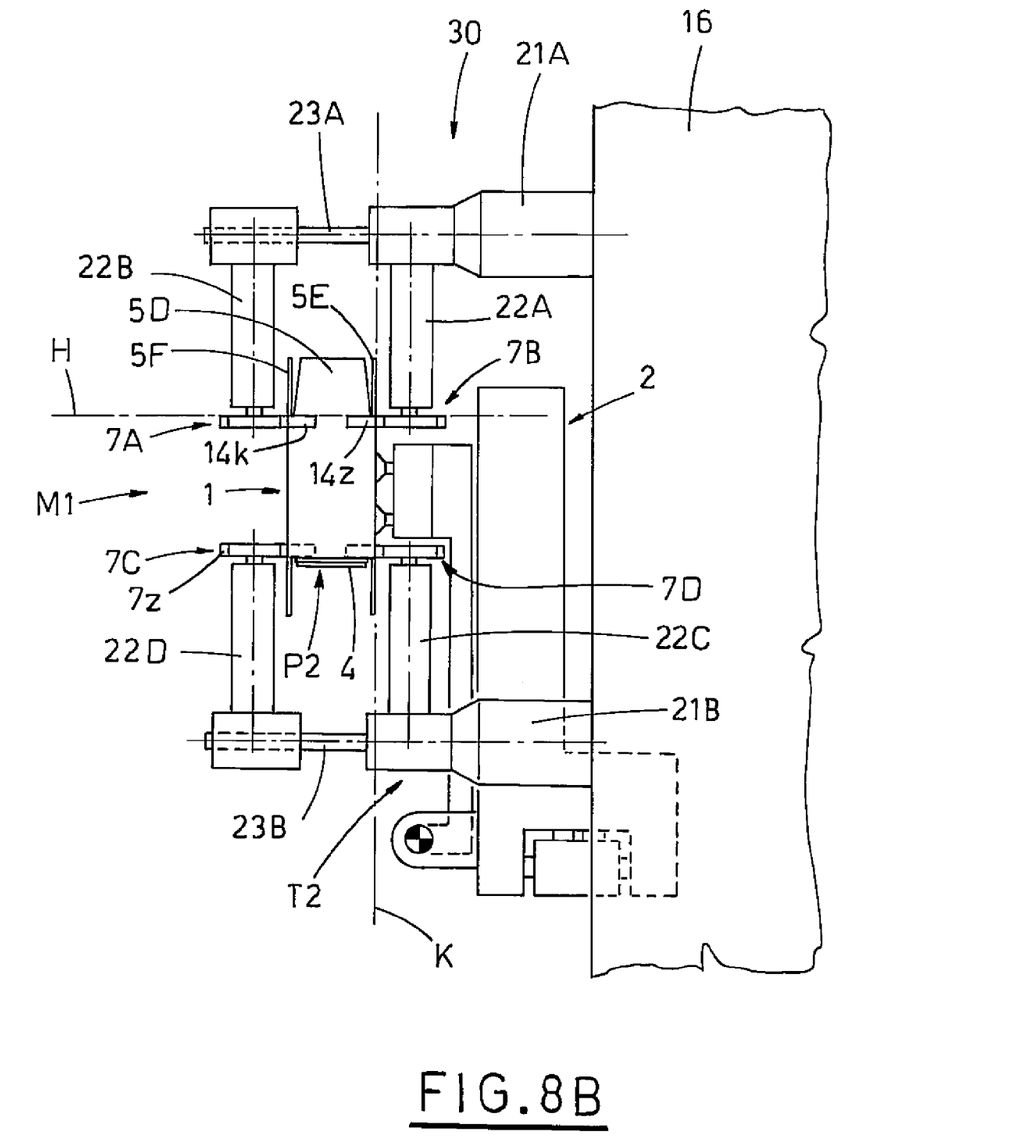
Figure 9A:
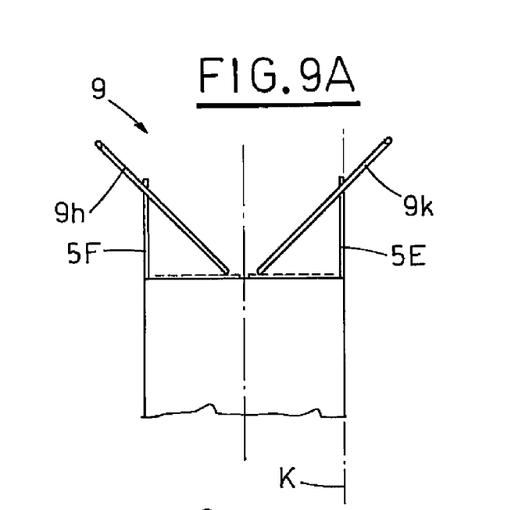
Figure 9B:
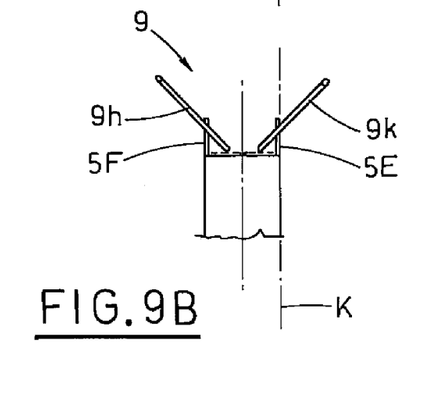
Figure 10A:
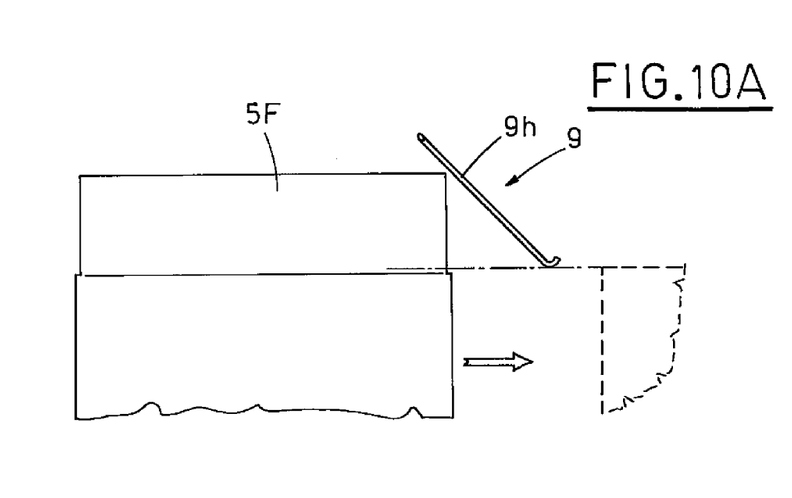
Figure 10B:
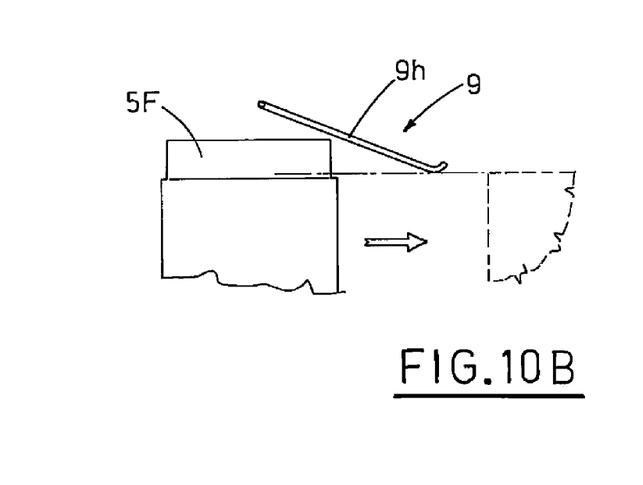

The support plane 4 is aimed at supporting erected tubular blanks 1, which are moved in the forwarding direction AV, and its height can be adjusted to a plurality of possible positions between a lowered position P1, associated to a blank maximum size M2 (FIGS. 1, 8A), and a raised one P2, associated to a minimum size M1 (FIGS. 1, 8B).

The height of the support plane 4 is adjusted according to the blank 1 size so that the relative upper transversal pre-creasing lines U remain always aligned with a third stationary horizontal reference plane H (for example FIGS. 1, 8A, 8B).

Likewise, the width of the support plane 4 depends directly on the size of the blank 1 being used.

Means 7 are aimed at guiding the erected tubular blanks 1 and at driving them on the horizontal support plane 4, in the forwarding direction AV, from the filling station R to means for folding the lower lateral flaps 5C, the upper fore flaps 5D, the rear flap 5D, and lateral flaps 5E, 5F of each blank 1, and to stations 12, 13 for closing the bottom and the cover of the so obtained box-like package, as it will be described later.

The means 7 include four endless conveyors, upper 7A, 7B and lower 7C, 7D, operated respectively by separate actuators (not shown for sake of simplicity), and e.g. two work groups 30 for supporting and for reciprocal space arrangement of the conveyors 7A, 7B, 7C, 7D, according to the blank 1 size (see FIGS. 8A, 8B as an indication).

In the shown example, each of the conveyors 7A, 7B, 7C, 7D includes an endless chain 7z, whose active run 7h is oriented longitudinal with respect to the machine (that is in the same forwarding direction AV), mounted on corresponding bearing member 15, supported by the work groups 30 and cantilevered in the filling station R.

The bearing member 15 has a selected profile such that the active run 7h acts as a guide for driving the blanks 1 from the filling station R in the forwarding direction AV.

The active runs 7h of the conveyors 7A, 7B, 7C, 7D face the respective lower and upper longitudinal portions of each of the opposite walls, first 6A and third 6C, of the erected tubular blanks 1, without interfering with the gripping means 18 of the first lateral wall 6A.

At least a pair of respective first 14h, 14j and second 14k, 14z lateral protrusions, associated to the lower conveyors 7C, 7D and the upper conveyors 7A, 7B (FIGS. 7A, 7B, 8A, 8B), are fastened to the relative chains 7z and aimed at, in the following order:

abutting against and striking corresponding portions of the rear wall 6B and the fore wall 6D of the blank 1 with respect to the forwarding direction AV.

Each pair of first 14h, 14j and second 14k, 14z lateral protrusions are clearly aligned to one another with respect to ideal separate vertical planes (just because they are aimed at abutting against and striking the erected tubular blanks 1), so that the second lateral protrusions 14k, 14z are offset in advance with respect to the first ones 14h, 14j, in the forwarding direction AV, by a distance equal to the longitudinal dimension of the blanks 1.

FIGS. 8A, 8B are section views taken along line VIII-VIII of FIG. 1, of a work group 30, described later.

The other work group 30, shown schematically in FIG. 1, is wholly similar to the one just mentioned, besides the presence of the actuator means, which e.g. drive corresponding toothed wheels with vertical axis into rotation, each of which wheel engaging with relative turning ends of the chains 7z of the conveyors 7A, 7B, 7C, 7D so that the lower conveyors 7C, 7D are powered independently from the upper conveyors 7A, 7B.

The work group 30 being discussed is an integral part of the frame 16 of the boxing machine and includes a fixed upper turret 21A, which carries a first vertical arm 22A, supporting the bearing member 15, associated to the upper conveyor 7B.

A first transversal stem 23A is fastened with the turret 21A and carries a second vertical arm 22B, supporting the bearing member 15, associated to the upper conveyor 7A outer with respect to the just mentioned conveyor 7B (see again FIGS. 8A, 8B).

The first transversal stem 23A slides longitudinally within the turret 21A and its position is adjusted in relation to the size of the blank 1 being processed so that the second pairs of protrusions 14k, 14z can abut against corresponding portions of the fore wall 6D of the erected blanks 1.

The group 30 includes also a lower turret 21B, which can be adjusted in a plurality of positions included between a lowered position T1, associated to the maximum size M2 of the erected blank 1, and a raised position T2, associated to the minimum size M1.

The lower turret 21B carries also a third vertical arm 22C, supporting the bearing member 15, associated to the lower conveyor 7D, and a second transversal arm 23B is fastened with the turret 21B and carries a fourth vertical arm 22D, supporting the bearing member 15, associated to the lower conveyor 7C outer with respect to the just mentioned lower conveyor 7D.

Still with reference to FIGS. 8A, 8B, it is specified that the first vertical arm 22A and the second vertical arm 22B extend downwards, whereas the third vertical arm 22C and the fourth vertical arm 22D extend upwards.

As it can be seen in Figures, the horizontal support plane 4 is interposed between the third vertical arm 22C and the fourth vertical arm 22D.

Also the position assumed by the lower turret 21B and the second transversal arm 23B depend on the size of the blank 1, because it is necessary to make sure that the first protrusions 14h, 14j engage corresponding portions of the surface of the blanks 1 rear wall 6B.

For example, the lower turret 21B is always moved along with the horizontal support plane 4, whenever the sizes of the blanks 1 being processed are changed.

Folding means, not shown as they are known, are situated downstream of the filling station R with respect to the forwarding direction AV and fold the upper flaps fore 5D and rear 5D of each already erected blank 1.

First means 8, aimed at folding the lower lateral flaps 5C of the blanks 1, are situated downstream of the filling station R with reference to the forwarding direction AV (FIG. 1).

They are connected to the horizontal support plane 4 and include first rods, having a predetermined orientation.

Likewise, second means 9 for folding upper lateral flaps 5E, 5F of the blanks 1 are situated downstream of the filling station R and of the above mentioned folding means, with respect to the forwarding direction AV.

The second folding means 9 include second bars 9h, 9k, integral with the machine frame 16 and having a predetermined orientation (see corresponding orthogonal projections shown in FIGS. 9A, 10A and 9B, 10B, respectively for the maximum size M2 and for the minimum size M1 of each blank 1).

A first station 12 is situated downstream of first folding means 8 and is aimed at closing firmly the bottom of the erected tubular blank 1, formed by the first lower flap 5A and second lower flap 5B (respectively, the rear flap 5A and the fore flap 5B with respect to the forwarding direction AV), folded inwards by an angle of 90°, and immediately below, by the lower lateral flaps 5C, likewise folded inwards by a 90° angle.

A second station 13 is likewise situated downstream of the second folding means 9 and is aimed at closing firmly the cover of the so obtained box, defined by the upper rear flap 5D and fore flap 5D, folded inwards by a 90° angle, and immediately above, by the upper lateral flaps 5E, 5F of the blank 1, likewise folded inwards by a 90° angle.

The first station 12 and the second station 13 include means of known type for closing firmly respectively the bottom and the cover of the box: actually, with reference to the first station 12 for example, some portions of the lowers flap 5A, 5B, 5C of the blank 1 can be mutually glued; otherwise, at least terminal opposite portions of the lower lateral flaps 5C of the blank 1 can be closed by adhesive tape.

The same considerations are valid also for the second station 13.

Finally, a support element 17, e.g. roller track, is situated downstream of the first station 12 and the second station 13, with respect to the forwarding direction AV, for receiving the boxes pulled by the conveyors 7A, 7B, 7C, 7D (FIG. 1).

It is specified that the folding member 3, the first folding means 8, the first station 12 and the roller track 17 are fixed with respect to the horizontal support plane 4, therefore, they move together with respect to the latter during the adjustments, which are necessary to change the size of the processed blanks 1.

The proposed boxing machine performs systematically repetitive operations on the boxes being formed: the reference will be made to only one of these work cycles in the following, supposing first only one erected blank 1 sliding on the horizontal support plane 4, then a number over one.

Figure 4:
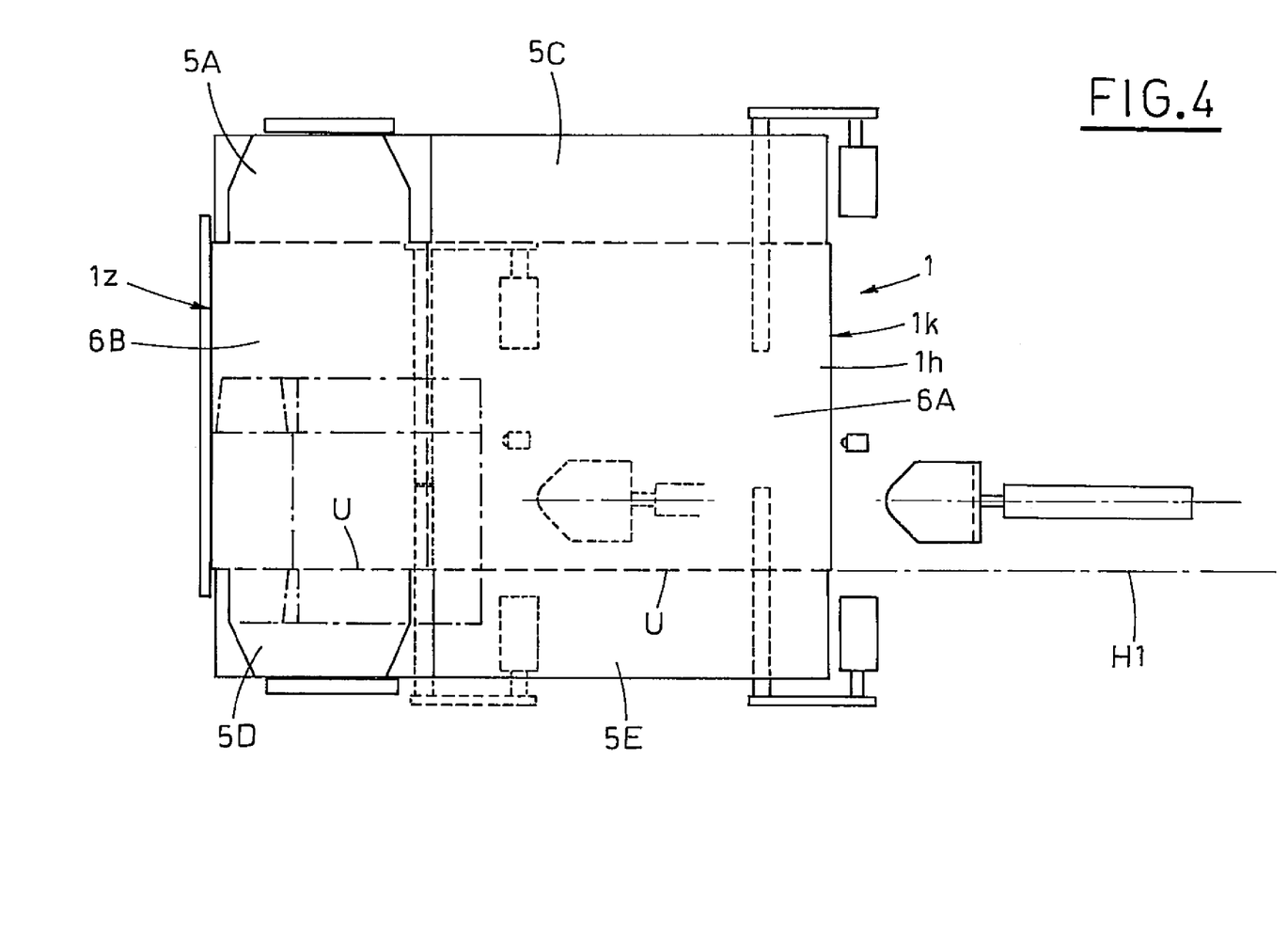
FIG. 4 is a section view taken along line IV-IV of the previous Figure.

The magazine 19 releases the tubular blanks 1 in flat folded configuration 1w one by one onto the active run 20A of the conveyor 20, so that their prefixed transversal pre-creasing line U is always aligned with respect to a prefixed ideal vertical plane H1, independently from the blank 1 dimensions (FIG. 4).

Figure 6A:
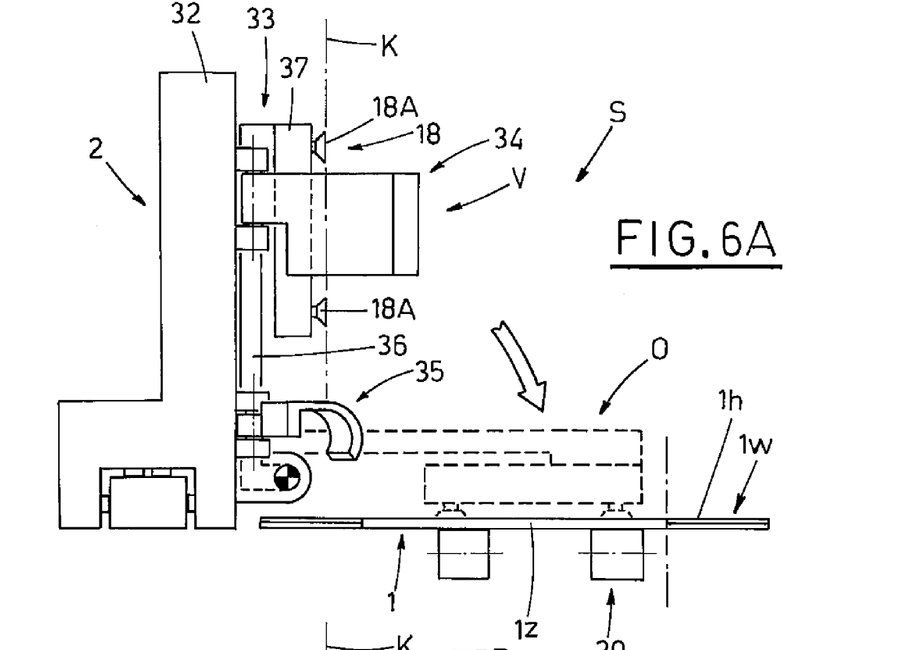
FIGS. 6A-6B are enlarged, front views of a second detail of FIG. 1, that is a unit for erecting a tubular blank, in this case of maximum dimensions, in two significant operation configurations.
Figure 6B:
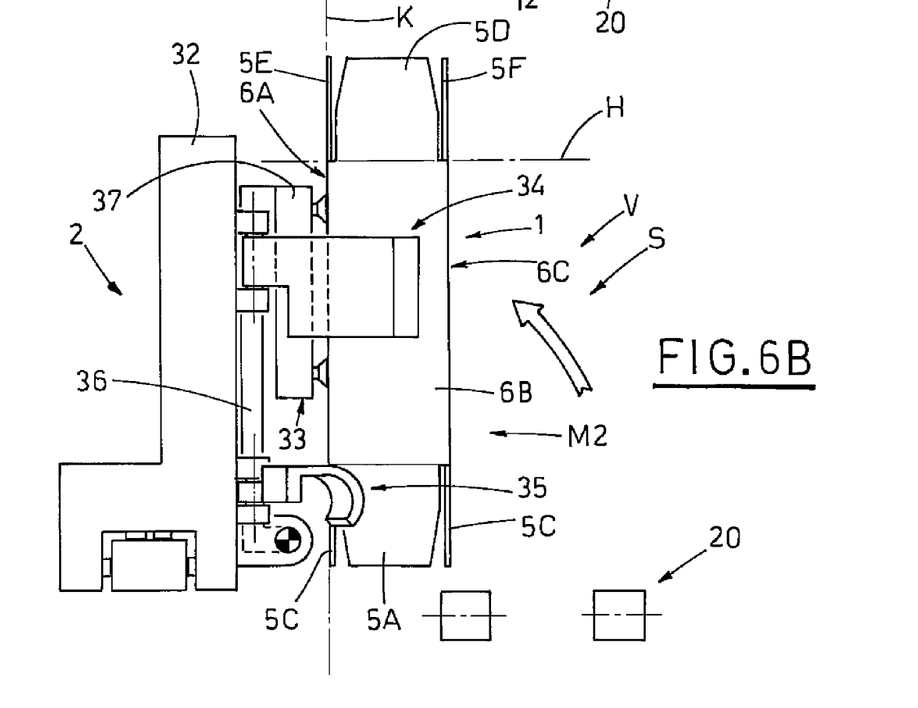
Figure 6C:
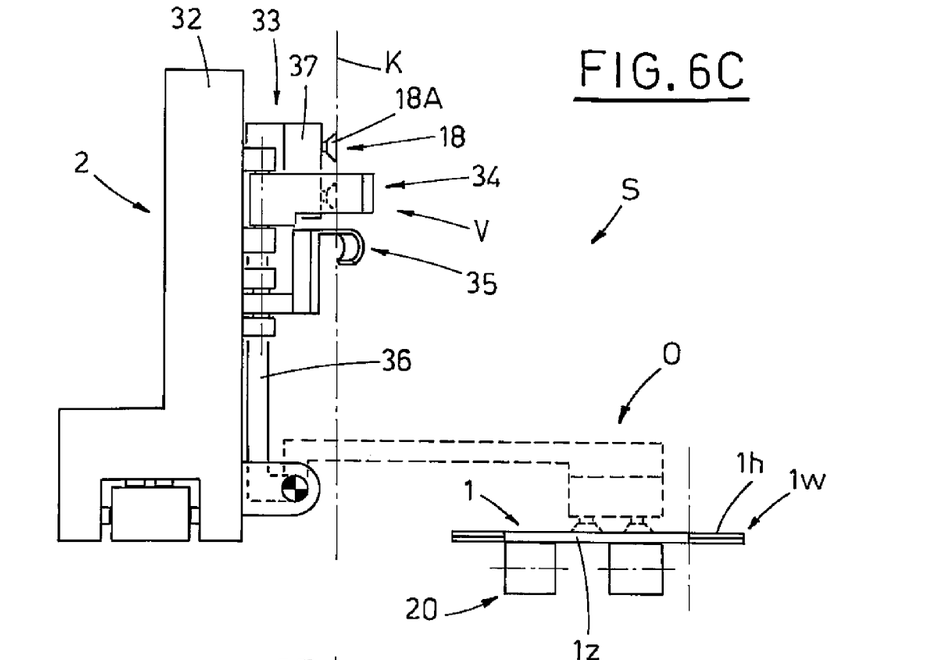
FIGS. 6C-6D show the unit of FIGS. 6A, 6B in two different significant operation configurations, related to a tubular blank of minimum dimensions.
Figure 6D:
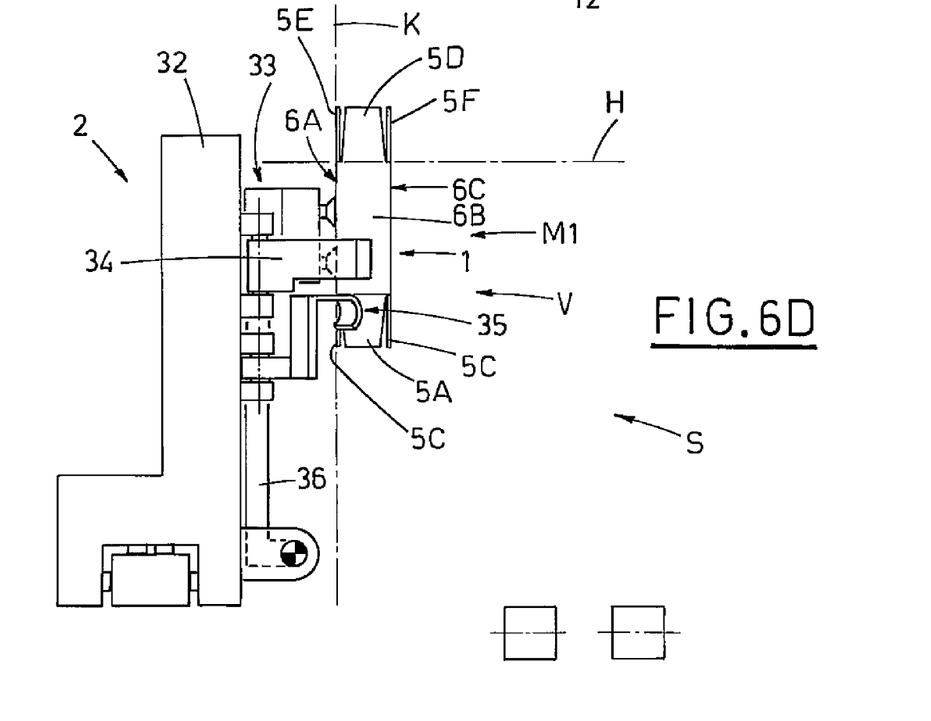

The conveyor 20 drives the blanks 1, now in horizontal configuration, to the erecting station S, until they strike against the abutment 11, as shown approximately in FIGS. 6A, 6C, related to the maximum size M2 and minimum size M1 of the blanks 1.

The arm 36 of the gripping and raising unit 33 is then taken to the horizontal position O, and the suction cups 18A get in contact with the first lateral wall 6A of the blank 1, belonging to the upper sheet 1h.

Then, the suction cups 18A are activated to suck and grip the first lateral wall 6A, and the loaded arm 36 returns to the vertical position V.

Next, the tubular blanks 1 is raised (FIGS. 6B, 6D) due to the gripping action of the means 18 on the first lateral wall 6A, and at the same time, rotated by a 90° angle, moving the first lateral wall 6A from a horizontal position to a vertical position, in which it is aligned with the second stationary vertical reference plane K.

In particular, the weight of the blank 1 and its raising by rotation, cause its partial erecting, making it assume an almost parallelepiped form with vertical axis with the relative upper transversal pre-creasing lines U aligned with respect to the third stationary horizontal plane H.

The first and second folder means 34, 35 are operated in reciprocal step relation and with the loaded arm 36 in the vertical position V.

The first folder means 34 touch and push the rear wall 6B of the blank 1, adjacent to the first lateral wall 6A and situated in the rear with respect to the forwarding direction AV, until it is arranged at right angle with respect to the first lateral wall 6A.

In this way, the blank 1 is erected, definitely assuming the shape of a rectangular parallelepiped with vertical axis.

The second folder means 35 strike the first lower flap 5A of the blank, situated at the rear with respect to the forwarding direction AV, with consequent inward folding thereof by a right angle.

Figure 7A:
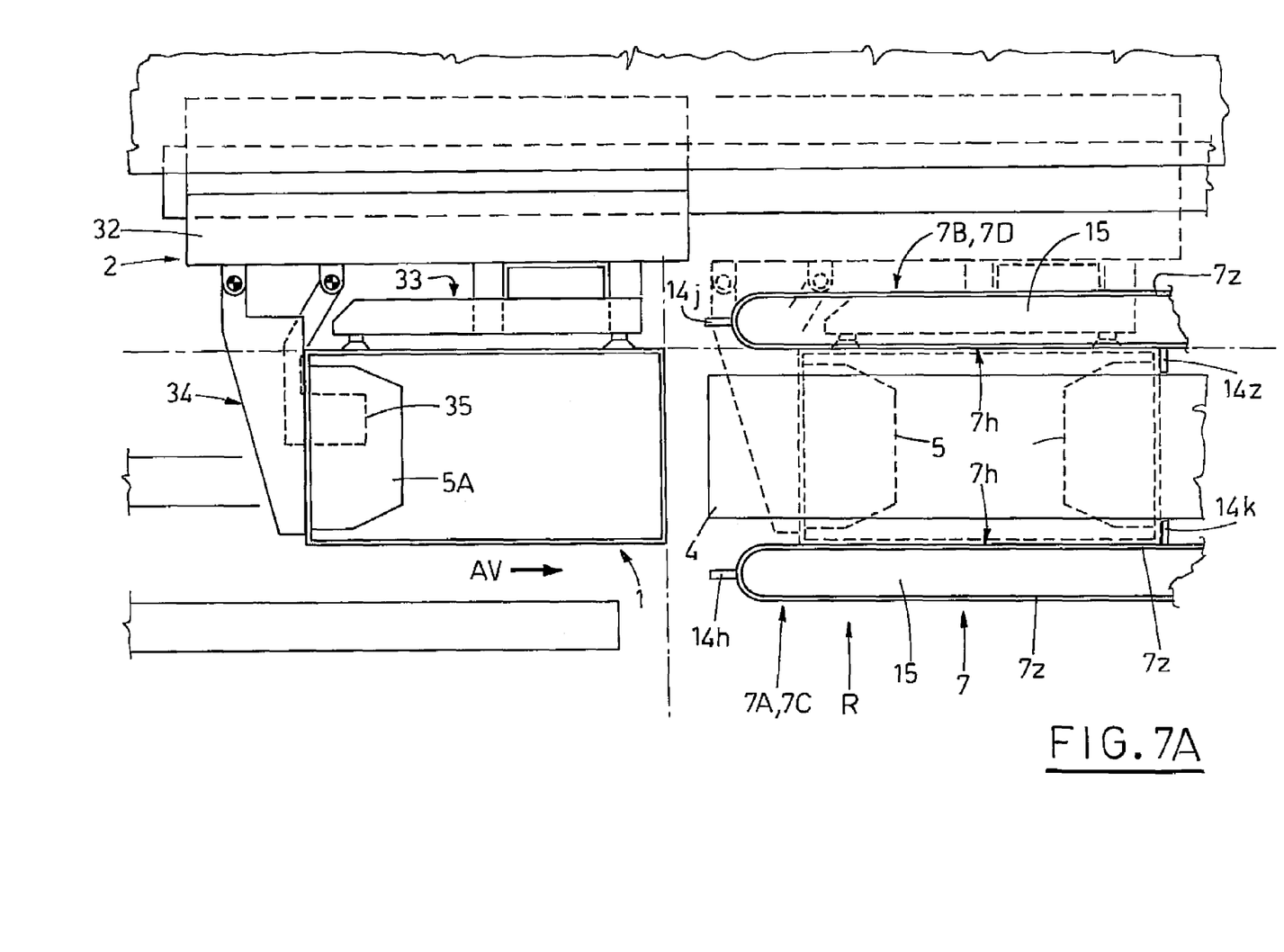
FIGS. 7A, 7B are enlarged, partial and top views of a third detail of FIG. 1, that is the erecting unit, acting on a blank of respectively maximum and minimum dimensions, and driving and guiding means.
Figure 7B:
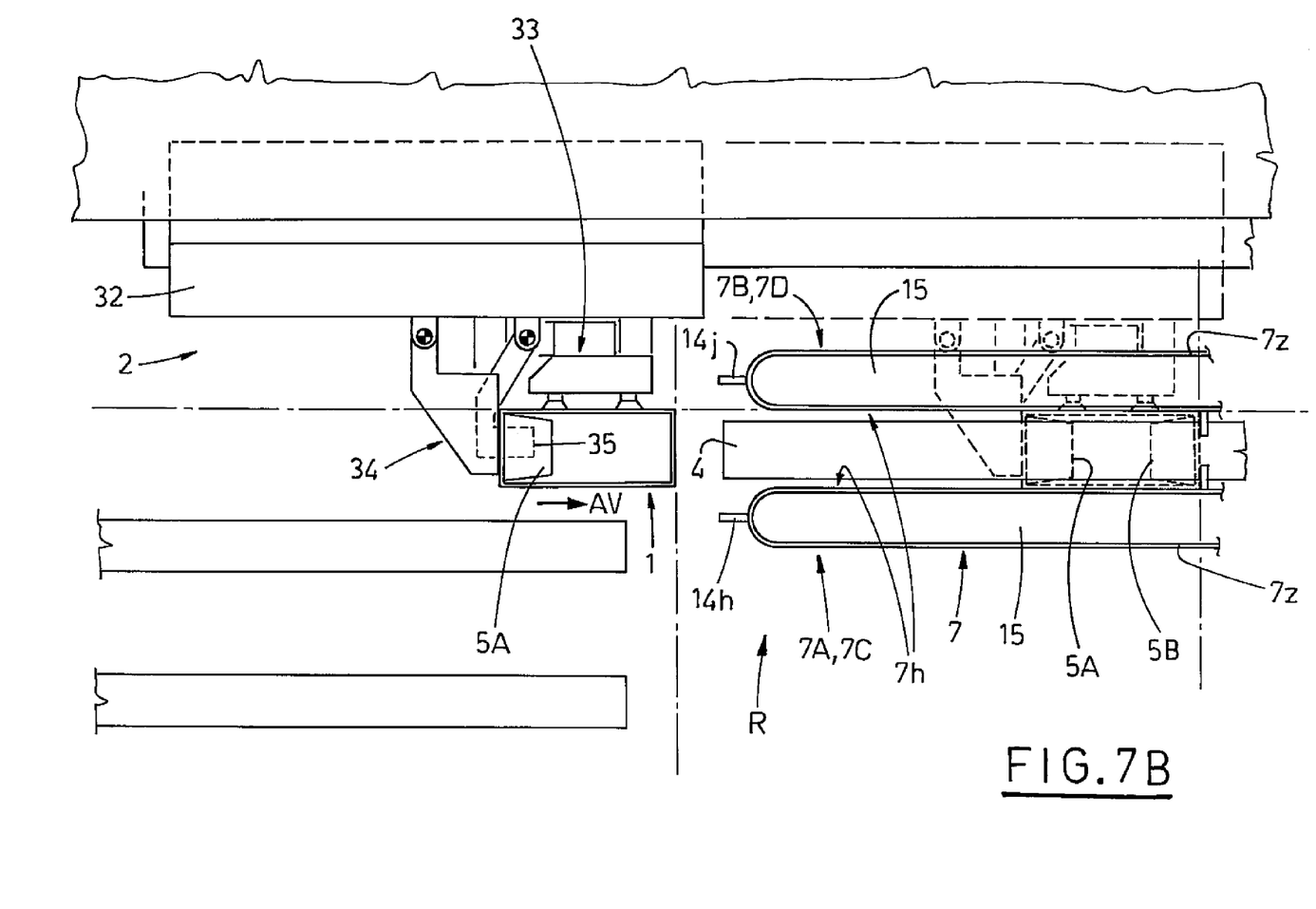

Afterwards, the carriage 32 is moved to the filling station R in suitable step relation with the operation of the driving and guiding means 7, whose conveyors 7A, 7B, 7C, 7D can be e.g. kept disabled until the blank 1 reaches the station R, with the first lateral protrusions 14j, 14h and the second lateral protrusions 14k, 14z arranged like in FIGS. 7A, 7B.

During this stroke the blank 1 remains aligned with the second stationary vertical reference plane K and the third stationary reference plane H.

The second lower flap 5B, facing the first lower flap 5A and situated at the front with respect to the forwarding direction AV, touches the folding member 3 up to its inward folding by a right angle.

The erected blank 1, with its first lower flap 5A and second lower flap 5B folded by a right angle, reaches the filling station R sliding the flaps 5A, 5B on the horizontal support plane 4 and entering the free space created by the conveyors 7A, 7B, 7C, 7D, until the fore wall 6D goes in abutment against the second lateral protrusions 14k, 14z of the upper conveyors 7A, 7B.

The tubular blank 1 remains in the station R for the time necessary for the insertion of articles 10 therein, performed by the manipulating means 60, keeping the first lateral wall 6A and the upper transversal pre-creasing lines U always aligned respectively with the second stationary vertical reference plane K and the third stationary horizontal reference plane H.

At this point, in a given time relation, the first lateral protrusions 14j, 14h are moved to contact the rear wall 6B, the gripping means 18 disengage from the first lateral wall 6A, the hopper 39 is lowered until its lower mouth 39A is introduced into the blank 1 and the latter is filled by the manipulating means 60.

The partial introduction of the hopper 39 into the erected blank 1 makes the blank maintain its erected configuration during the filling operations, preventing also the articles 10, during their introduction into the blank 1, from touching the upper flaps 5D, 5E, 5F.

The articles 10, introduced vertically by the manipulating means 60 go down to rest, during the filling step, onto the first lower flap 5A and the second lower flap 5B, as well as onto the horizontal support plane 4.

Afterwards, all the lower conveyors 7C, 7D and the upper conveyors 7A, 7B are operated at the same speed: the first lateral protrusions 14j, 14h push the blank 1 in the forwarding direction AV, while he second lateral protrusions 14k, 14z, still touching the fore wall 6D, cooperate with the first lateral protrusions 14j, 14h in maintaining the blank 1 erected during the sliding of the latter on the horizontal support plane 4.

During its motion in the forwarding direction AV, the erected blank 4 loaded with articles 10 is subjected to the action of the means for folding of the upper rear flap 5D and fore flap 5D, as well as of the first folding means 8 and the second folding means 9.

The lower lateral flaps 5C and the upper lateral flaps 5E, 5F of the passing blank strike the pair of rods of the first folding means 8 and the second bars 9h, 9k of the second folding means 9, with the consequent inward folding of the above flaps by a right angle.

Consequently, the horizontal support plane 4 remains interposed between the first and second lower flap 5A, 5B and the lower lateral flaps 5C of the blank 1, without hindering its forward motion.

Afterwards, the bottom and the cover of the so obtained box are closed firmly by respectively first station 12 and the second station 13.

As it has already been illustrated, adhesive taping includes application of an adhesive tape to the terminal opposite portions of the lateral flaps 5C, 5E, 5F of the blank Otherwise, the strip of the adhesive tape can extend also to corresponding portions of the first lateral wall 6A and the fore wall 6D of the blank 1.

This is obtained with means of known type, and in particular for the taping of the blank 1 bottom, there must be at least one window made in the support plane 4 in a position corresponding to the first station 12, to allow the taping operations.

The moving of the blank 1 in the forwarding direction AV, with its bottom closed firmly, gradually slips off the end of the horizontal support plane 4 from the bottom.

The tubular blank 1, slipping off the plane 4, is placed on the roller track 17.

More than one tubular blank 1 can be placed on the horizontal plane 4 in order to increase the machine production rate.

In this case, all the conveyors 7A, 7B, 7C, 7D are moved with the same operation speed and, at the same time, for the entire duration of the cycle, each pair of the second lateral protrusions 14k, 14z is offset in advance with respect to the corresponding first lateral protrusions 14j, 14h, which follows it by a distance equal to the longitudinal dimension of the blank 1 being processed.

This means that the blank 1, carried by the unit 2, touches the second lateral protrusions 14k, 14z already at the turning ends of the conveying means 7A, 7B, 7C, 7D, reaching the filling station R at the same speed as the latter, with the first lateral protrusions 14j, 14h already touching the first lateral wall 6A of the blank 1.

At this point, the carriage 32 stops in the filling station R, to allow the manipulating means 60 to act, and at the same time the conveyors 7A, 7B, 7C, 7D are deactivated.

Afterwards, when the articles 10 have been inserted into the blank 1 and the first lateral wall 6A of the blank 1 has been disengaged from the gripping means 18, the blank 1 is pulled again by the conveyors 7A, 7B, 7C, 7D, as already said, operated with the same speed, in the forwarding direction AV, for the subsequent folding and firm closing of the cover of the so obtained box, as described above.

In case of the size change of the tubular blanks 1, each new sized blank is released from the magazine 19 onto the conveyor 20 with the transversal pre-creasing line U (FIG. 4) always aligned with the prefixed vertical reference plane H1.

Thus, the subsequent gripping of the first lateral wall 6A and its raising by a right angle rotation with respect to the articulation axis of the arm 36 causes the alignment of the transversal pre-creasing line U, now upper, with the third stationary horizontal reference plane H, independently from the blank 1 dimensions.

Obviously, also the alignment of the first lateral wall 6A with the second stationary vertical reference plane K remains unchanged for the blank 1, subjected to the gripping action of the means 18.

As already said, the conveyors 7A, 7B, 7C, 7D, the horizontal support plane 4, the first folding means 8, the first closing station 12 and the roller track 17 change their space arrangement at each size change in order to maintain the alignment of the first lateral wall 6A and the upper transversal pre-creasing line U of the blank 1 respectively with the second stationary vertical reference plane K and the third stationary horizontal reference plane H, at least for the time necessary for loading articles 10 into the blank dwelling in the filling station R.

The alignment of the transversal pre-creasing lines of the blank 1 with the third horizontal plane H, according to the invention, is extremely advantageous because it allows the stroke performed by the manipulating means 60, aimed at introducing articles into the boxes being formed, to be set to a minimum extension.

Actually, in case of containers of constant cross-section area and gradually decreasing height, it is noticed immediately that the filling time decreases gradually with respect to prior art, since the vertical stroke, which the manipulating means 60 must perform, decreases in proportion to the box dimensions.

In this way, a proper disadvantage of the known solutions is resolved, because even small boxes (that is of limited height) are now filled in satisfactory time, maintaining high production rate of the machine independently from the size in use.

Still in comparison with known solutions, according to which a center line of the erected blank is aligned with a given vertical plane, the alignment, according to the present invention, of the first lateral wall 6A of the blank 1 with the second stationary vertical reference plane K, allows, as it can be guessed, to minimize the transversal stroke of the manipulating means 60 at the size change, thus allowing a still higher production rate of the boxing machine.

The method for packaging articles into boxes, with the just described machine being its application example, includes the following steps:

release of each tubular blank 1 in flat folded configuration 1w from the storage magazine 19 onto the active run 20A of the conveyor 20, along e.g. a circumference arc C path;

conveying of the blanks 1 in horizontal position to the erecting station S, until they touch the stationary abutment 11 provided therein;

in the erecting station S, gripping of the first lateral wall 6A of each tubular blank 1, by the means 18, and subsequent raising thereof by a 90° rotation, so that the blank 1 assumes a parallelepiped form with vertical axis, due to the rotation raising and its weight;

action on the rear wall 6B of the blank 1 adjacent to the first lateral wall 6A, subjected to the gripping action, e.g. the wall 6B situated at rear with respect to the forwarding direction AV of the blank 1, to fold it by a right angle with respect to the first lateral wall 6A, with consequent erecting of the blank 1;

striking the first lower flap 5A of the tubular blank 1, situated at rear with respect to the forwarding direction AV, with consequent inward folding thereof by a 90° angle;

moving of the erected and kept raised blank 1, in the forwarding direction AV, by the gripping means 18, in the forwarding direction and towards the filling station R;

striking the second lower flap 5B of the tubular blank 1, opposite to the first lower flap 5A and situated at front with respect to the forwarding direction AV, with consequent inward folding thereof by a 90° angle, in step relation with the entrance of the blank 1 to the filling station R;

sliding of the first lower flap 5A and the second lower flap 5B, each folded inward by a 90° angle, on the horizontal support plane 4, in step relation with the blank 1 reaching the filling station R;

in the filling station R, disengaging of the gripping means 18 from the first lateral wall 6A and, in step relation, in-vertical insertion of articles 10 into the erected blank 1, placed on the first lower flap 5A and the second lower flap 5B and on the horizontal support plane 4;

moving the tubular blank 1, with consequent sliding of the latter along the horizontal support plane 4 by driving and guiding means 7, in the forwarding direction AV, to the stations for folding the remaining lower lateral flaps 5C and the upper flaps 5D, 5E, 5F of the blank 1 and for closing the bottom and the cover of the so obtained box, with the driving and guiding means 7 acting on the longitudinal lower and upper portions of the first lateral wall 6A, in the part not engaged with the gripping means 18, and of the opposite 6C.

The first lateral wall 6A is a part of the upper sheet 1h of the blank 1 and the rotation raising of the latter causes rotation of the first lateral wall 6A by a 90° angle on an axis parallel to the transversal pre-creasing lines.

The rotation raising of each blank 1 causes the alignment of the first lateral wall 6A and the transversal pre-creasing lines M, now upper, respectively with the second stationary vertical reference plane K and the third stationary horizontal reference plane H, at least until the blank 1 reaches the filling station R and for the time necessary for the introduction articles into the blank by the manipulating means 60.

This remains valid also with different dimensions of the tubular blank 1, included between a predetermined minimum size M1 and a maximum size M2.

The second lower flap 5B is folded inward by a 90° angle during translation of the blank 1 from the erecting station S to the filling station R, e.g. by striking the second lower flap 5B by the folding member 3.

The first folding means 8, situated upstream of the first station 12 with respect to the forwarding direction AV, strike and fold, inward by a 90° angle, the lower lateral flaps 5C of the tubular blank 1 for closing the blank 1 bottom, in time relation with the blank 1 motion effected by the driving and guiding means 7 in the forwarding direction AV.

The motion of the blank 1, with its bottom closed firmly, gradually slips it off the horizontal support plane 4 and places it on the roller track 17.

According to the proposed method, the upper fore flaps 5D and rear flaps 5D of the tubular blank 1, are then hit and folded inward by a 90° angle.

The forward motion of the blank 1, determined by the driving and guiding means 7, makes the second folding means 9, situated upstream of the second station 13, strike and fold inward the upper lateral flaps 5E, 5F by a 90° angle, for closing the cover of the blanks 1.

The main advantage of the invention lies in a method and a boxing machine capable of carrying it out, which allow high production rate, independently from the dimensions of the blank being processed, thus resolving in best way the problems mentioned in the introductory note.

Actually, with respect to known solutions, the time necessary for filling boxes being formed, in particular for small sizes, is considerably reduced, due to the systematic alignment of each blank with respect to the second stationary reference plane K and the third stationary reference plane H, which allows the transversal and vertical stroke of the manipulating means 60 to be reduced.

Another advantage of the invention lies in a method for packaging articles in boxes, which is simple and essential, and whose carrying out allows high working speeds to be achieved at costs relatively low with respect to prior art.

A further advantage of the invention derives from a machine for packaging articles in boxes, which allows an operator to control visually the boxes being formed, filled and closed all the time.

Moreover, the particular arrangement of the conveyors 7A, 7B, 7C, 7D allows a direct access to the container and to the stations, in which the above operations are performed.

Further, the machine is reliable, its structure is essential, production rate high and costs relatively low with respect to known solutions.

It is understood that the proposed invention has been described as a mere, not limiting example. Therefore, it is obvious that any changes or variants applied thereto remain within the protective scope defined by the following claims.

I claim:

1. A method for packaging articles in boxes, the boxes being obtained from tubular blanks, including an upper sheet and a lower sheet, connected along two opposite ends and facing each other to define a flat folded configuration, each of said tubular blanks having also longitudinal pre-creasing lines for defining a first and a second adjacent lateral walls in said upper sheet, and a third and a fourth adjacent lateral walls in said lower sheet, and for facilitating folding of the tubular blank into a substantially parallelepiped shape, and having also transversal pre-creasing lines for defining and facilitating folding of a plurality of flaps, the method including the following steps:

conveying one tubular blank in flat folded configuration and in horizontal arrangement, to an erecting station;

gripping said first lateral wall of the tubular blank, by gripping and raising means and subsequent raising of the blank by a 90° rotation, so that the blank assumes a parallelepiped form with a vertical axis, due to the rotation raising and weight of the same blank;

striking at least one second lateral wall of said blank with said first lateral wall still subjected to the gripping action, to define an orientation at right angle of said second lateral wall with respect to said first lateral wall, with consequent erecting of the blank;

striking a first lower flap of the tubular blank, situated at rear with respect to a forwarding direction of the blank, with consequent inward folding of said first lower flap by a 90° angle;

moving the erected blank, still kept raised, in the forwarding direction, by said gripping and raising means, in said forwarding direction and into a filling station;

striking a second lower flap of said tubular blank, opposite to said first lower flap and situated at the front with respect to the forwarding direction, with consequent inward folding thereof by a 90° angle, in step relation with said blank arriving at the filling station;

sliding of said first lower flap and the second lower flap, each folded inward by a 90° angle, on a horizontal support plane, situated in the filling station;

in said filling station, disengaging of the gripping and raising means from said first lateral wall and, in step relation, vertical insertion of at least one article into the erected blank, placed on the horizontal support plane;

sliding the tubular blank from said filling station along said horizontal support plane by driving and guiding means, in said forwarding direction, to stations for folding the remaining lower lateral flaps and upper flaps of the blank and for closing bottom and cover of a box thus obtained, with said driving and guiding means acting on at least a longitudinal portion of said first lateral wall, in a part not engaged by said gripping and raising means, and on at least one longitudinal portion of said third lateral wall of said tubular blank, opposite to said first lateral wall.

2. A method, according to claim 1, wherein before the first lateral wall is hit and folded, the tubular blank reaching the erecting station touches a stationary abutment, situated in the erecting station and defining a first stationary vertical reference plane.

3. A method, according to claim 1, wherein said rotation raising of each of said tubular blank causes alignment of said first lateral wall with a second stationary vertical reference plane, and such alignment is maintained at least until said tubular blank reaches the filling station.

4. A method, according to claim 3, wherein said alignment of said first lateral wall of said blank with said second stationary vertical reference plane is maintained also when dimensions of the blank change, within a prefixed minimum size and a maximum size.

5. A method, according to claim 1, wherein said rotation raising of said tubular blank causes alignment of its upper transversal pre-creasing line with a third stationary horizontal reference plane, and in that this alignment is maintained a least until said tubular blank reaches the filling station.

6. A method, according to claim 5, wherein the alignment of the upper transversal pre-creasing line of said blank with said third stationary horizontal reference plane is maintained also when the dimensions of the blank change, within a prefixed minimum size and a maximum size.

7. A method, according to claim 1, wherein rotation raising of said blank makes the first lateral wall rotate by a 90° angle on an axis parallel to the transversal pre-creasing lines of the tubular blank.

8. A method, according to claim 1, wherein said tubular blank, in flat folded configuration is released from an associated storage magazine onto a active run of a conveyor and then the released blank is conveyed, in horizontal configuration, to the erecting station.

9. A method, according to claim 8, wherein said tubular blank is released onto said active run of the conveyor along a path including at least one circumference arc.

10. A method, according to claim 1, wherein said second lower flap is folded by a 90° angle during translation of the tubular blank from said erecting station and said filling station (R).

11. A method, according to claim 1, wherein said lower lateral flaps of said tubular blank are hit by first folding means, situated upstream of a first station for closing the bottom of said tubular blank, with respect to said forwarding direction, with consequent inward folding of the lower lateral flaps by an angle of about 90°, in time relation with the said tubular blank being driven in the forwarding direction by said driving and guiding means.

12. A method, according to claim 11, wherein said lower flaps, each folded inward by a 90° angle, define a bottom of said tubular blank firmly closed in the first closing station.

13. A method, according to claim 12, wherein moving the tubular blank, with its bottom firmly closed, in said forwarding direction by said driving and guiding means, makes the tubular blank progressively slip off said horizontal support plane and move on a support element.

14. A method, according to claim 1, including striking upper fore and rear flaps of said tubular blank with respect to the forwarding direction, with consequent inward folding of said flaps by a 90° angle, and afterward striking said upper lateral flaps of the tubular blank, with consequent inward folding of the latter by a 90° angle, during the motion of said tubular blank in the forwarding direction.

15. A method, according to claim 14, wherein the cover of said tubular blank, defined by said upper flaps of the blank each folded inward by a 90° angle, is firmly closed in said second closing station.

* * * * *